(12) United States Patent
Cai

(10) Patent No.: US 8,490,929 B2
(45) Date of Patent: Jul. 23, 2013

(54) BEAM CLAMP CONNECTOR

(75) Inventor: Xueming Cai, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 653 days.

(21) Appl. No.: 12/539,664

(22) Filed: Aug. 12, 2009

(65) Prior Publication Data

US 2010/0047007 A1  Feb. 25, 2010

Related U.S. Application Data

(60) Provisional application No. 61/090,051, filed on Aug. 19, 2008.

(51) Int. Cl.
*E21F 17/02* (2006.01)
*F16L 3/00* (2006.01)

(52) U.S. Cl.
USPC ............... 248/59; 248/58; 411/400; 411/401; 403/67; 403/68

(58) Field of Classification Search
USPC ................ 248/59, 61, 63, 65, 73, 49, 58, 72, 248/74.1, 323, 327; 403/67, 68, 69, 70, 71, 403/187, 188, 189, 190, 191, 192, 193, 194, 403/195, 201, 230, 233, 238; 411/400, 401
See application file for complete search history.

(56) References Cited

U.S. PATENT DOCUMENTS

| | | | |
|---|---|---|---|
| 631,887 A * | 8/1899 | Clark | 248/59 |
| 635,885 A * | 10/1899 | Watson | 248/58 |
| 819,259 A | 5/1906 | White | |
| 850,623 A * | 4/1907 | Clark | 248/59 |
| 1,200,474 A * | 10/1916 | Dunlap | 248/49 |
| 1,568,122 A | 1/1926 | Zifferer | |
| 1,820,229 A | 8/1931 | Korns | |
| 1,888,342 A * | 11/1932 | Anderson | 248/68.1 |
| 2,161,782 A * | 6/1939 | Flower | 248/59 |
| 2,422,865 A | 6/1947 | Tucker | |
| 3,039,161 A | 6/1962 | Gagnon | |
| 3,084,893 A | 4/1963 | Ruth | |
| 3,124,330 A | 3/1964 | Robinson | |
| 3,232,393 A * | 2/1966 | Attwood | 403/387 |
| 3,288,409 A * | 11/1966 | Bethea, Jr. | 248/62 |
| 3,493,206 A * | 2/1970 | Albro | 248/59 |
| 3,891,298 A * | 6/1975 | Yorgin et al. | 439/620.08 |
| 4,458,975 A * | 7/1984 | Bohlin et al. | 439/811 |
| 4,846,431 A | 7/1989 | Pflieger | |
| 4,901,963 A | 2/1990 | Yoder | |
| 4,953,820 A | 9/1990 | Yoder | |
| 5,014,950 A | 5/1991 | Ohman et al. | |

(Continued)

*Primary Examiner* — Nkeisha Smith
(74) *Attorney, Agent, or Firm* — Hoffmann & Baron, LLP

(57) ABSTRACT

A universal beam clamp connector accommodates either a fixed attachment or a swivel attachment of a threaded rod to a support beam clamp. The beam clamp connector includes a connector portion and a threaded rod extender. A threaded rod extender has a cylindrical shape and an exterior surface with threading thereon. The connector portion includes a topside, a tool engaging portion and a central body extending therebetween. The threaded rod extender protrudes from the top side and the tool engaging portion protrudes from the central body. The central body includes an opening therethrough. The opening is defined by a top inner surface, a bottom inner surface and two opposing side inner surfaces. A nut is used to secure a threaded rod of a device to the beam clamp connector.

20 Claims, 7 Drawing Sheets

U.S. PATENT DOCUMENTS

| | | | |
|---|---|---|---|
| 5,056,952 A * | 10/1991 | Gringer | 403/96 |
| 5,131,780 A | 7/1992 | Love | |
| D364,792 S | 12/1995 | Yoder et al. | |
| 5,518,351 A * | 5/1996 | Peil | 411/383 |
| 5,701,991 A | 12/1997 | Helmetsie | |
| 5,765,902 A | 6/1998 | Love | |
| 5,860,691 A | 1/1999 | Thomsen et al. | |
| 7,011,284 B2 | 3/2006 | Melius | |
| 7,766,704 B2 * | 8/2010 | Robinson et al. | 439/814 |
| 7,793,988 B1 * | 9/2010 | Shemtov | 285/61 |
| 7,941,912 B2 * | 5/2011 | Follmann et al. | 29/729 |

* cited by examiner

US 8,490,929 B2

BEAM CLAMP CONNECTOR

CROSS-REFERENCE TO RELATED APPLICATION

This application claims priority to U.S. Provisional Patent Application No. 61/090,051 filed on Aug. 19, 2008, all of which are incorporated herein by reference.

FIELD OF THE INVENTION

The present invention relates generally to a beam clamp connector. More particularly, the present invention relates to a connector for securement and support of various attachments to a beam clamp.

BACKGROUND OF THE INVENTION

Beam clamps provide a temporary and/or permanent mount to a wide range of tapered or flat beams. For example, beam clamps are attached to the flange of the support beam and provide connection points for threaded rod so as to allow for a way to secure various attachments to the support beam. For example, in an industrial setting, a conduit channel, lighting, equipment or piping can be attached to or suspended from a support beam using a variety of clamping devices.

Some prior art clamps are limited in their design, for example, clamping devices are designed to attach to a specific surface and size beam. Additionally, some clamping devices are designed to only allow for attachment of a rod in a fixed manner perpendicular to the clamp, while other clamping devices are designed to provide a rod that can pivot with respect to the clamp. Thus, depending on the desired attachment option, purchase of one or the other beam clamp is required to meet the user's need.

It is therefore desirable to provide a universal clamp connection device, which can be used for either form of attachment, fixed or pivotal, and which can be used in conjunction with a variety of commercially available beam clamps. Additionally, a universal clamp connection device is needed that provides for easy installation and removal of the clamp connection device.

SUMMARY OF THE INVENTION

The present invention is directed to a universal beam clamp connector which provides fixed, swivel or pivoting attachment of a threaded rod to a support beam. The beam clamp connector includes a connector portion and a threaded rod extender. The threaded rod extender has a cylindrical shape and an exterior surface which includes threading thereon. The connector portion includes a top side, a tool engaging hexagonal portion and a central body extending therebetween. The threaded rod extender protrudes from the top side and the tool engaging portion protrudes from the central body. The central body includes an opening therethrough. The opening is defined by a top inner surface, a bottom inner surface and two opposing side inner surfaces. The top inner surface includes a top cylindrical hole with threading therein and the bottom inner surface includes a bottom cylindrical hole which extends through the bottom inner surface and though the tool engaging hexagonal portion.

DETAILED DESCRIPTION OF THE PREFERRED EMBODIMENT

Figure 1:
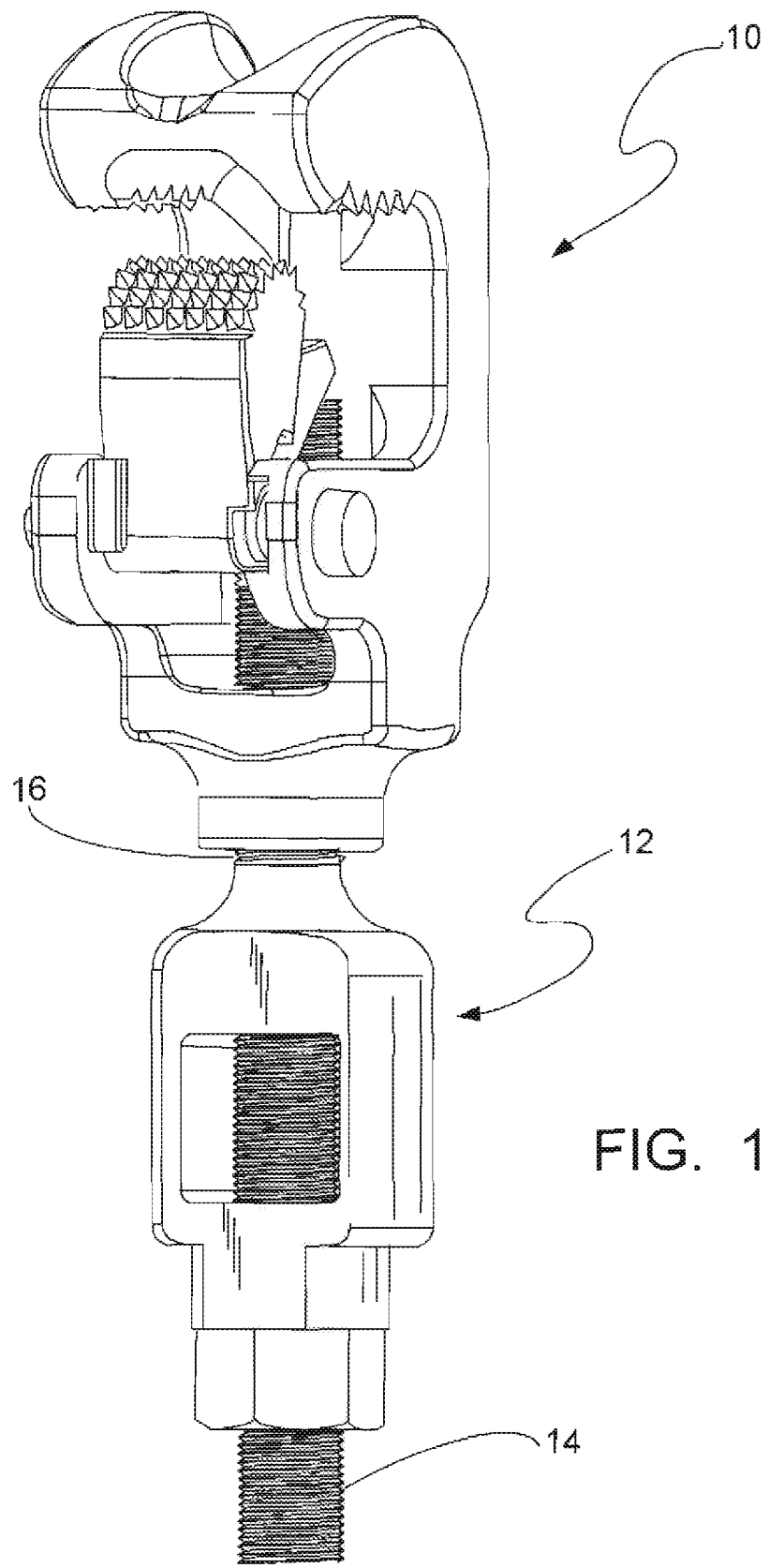
FIG. 1 is a perspective view of a beam clamp connector according to the present invention, including a clamp and threaded rod.
Figure 3:
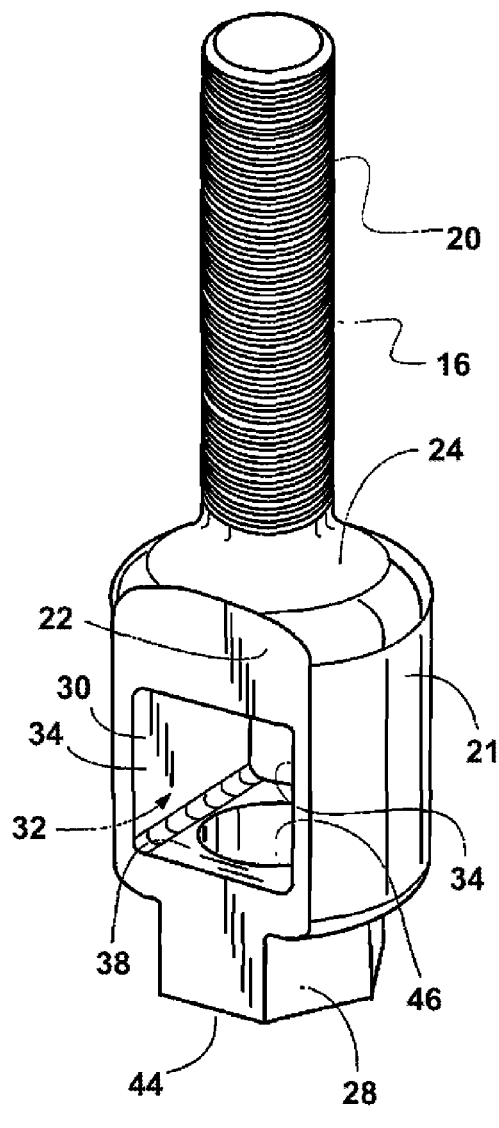
FIG. 3 is an upper perspective view of the beam clamp connector of FIG. 2.
Figure 2:
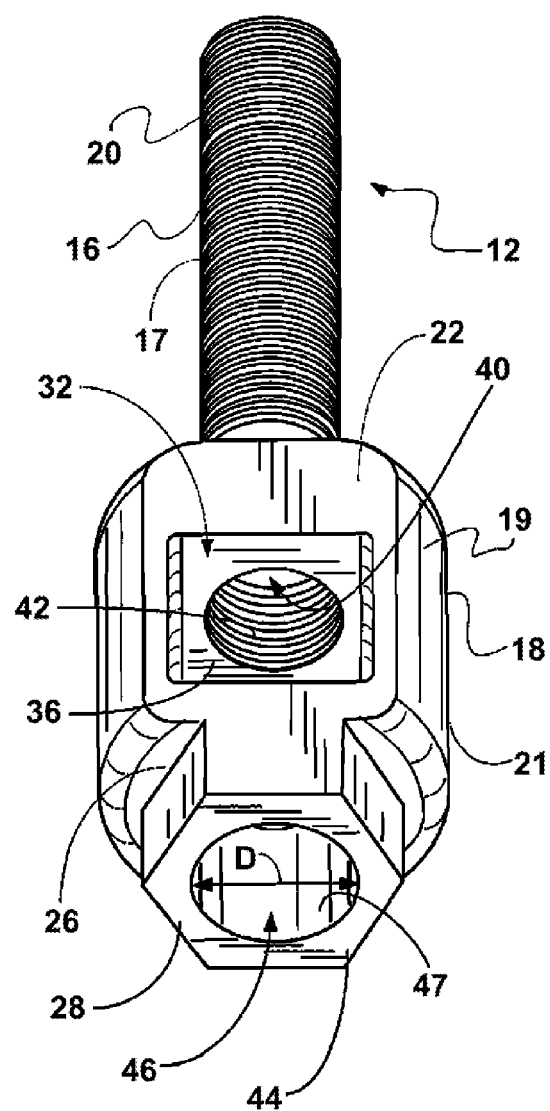
FIG. 2 is a lower perspective view of the beam clamp connector according to the present invention.
Figures 4, 5:
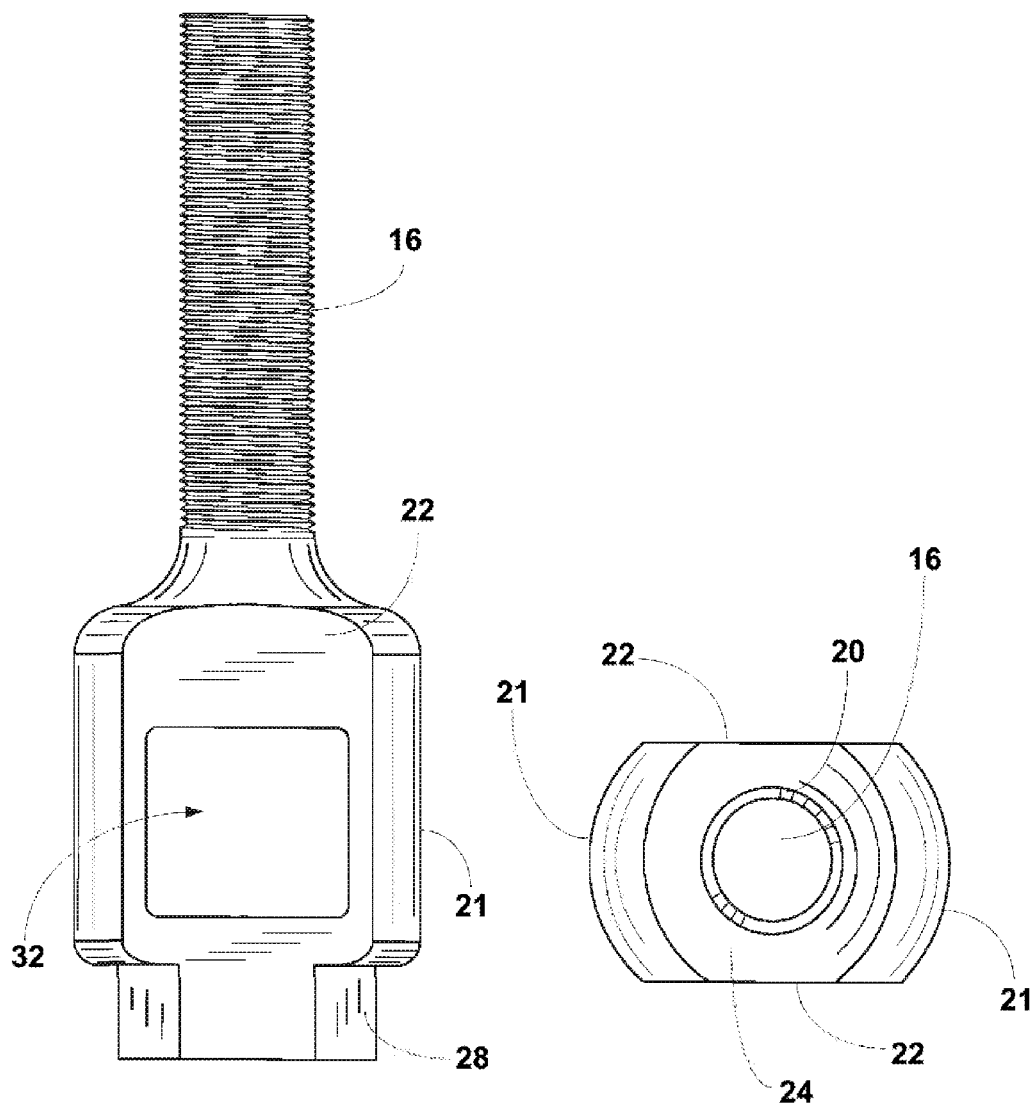
FIG. 4 is a front elevational view of the beam clamp connector of FIG. 2.
FIG. 5 is a top plan view of the beam clamp connector of FIG. 4.
Figures 6, 7:
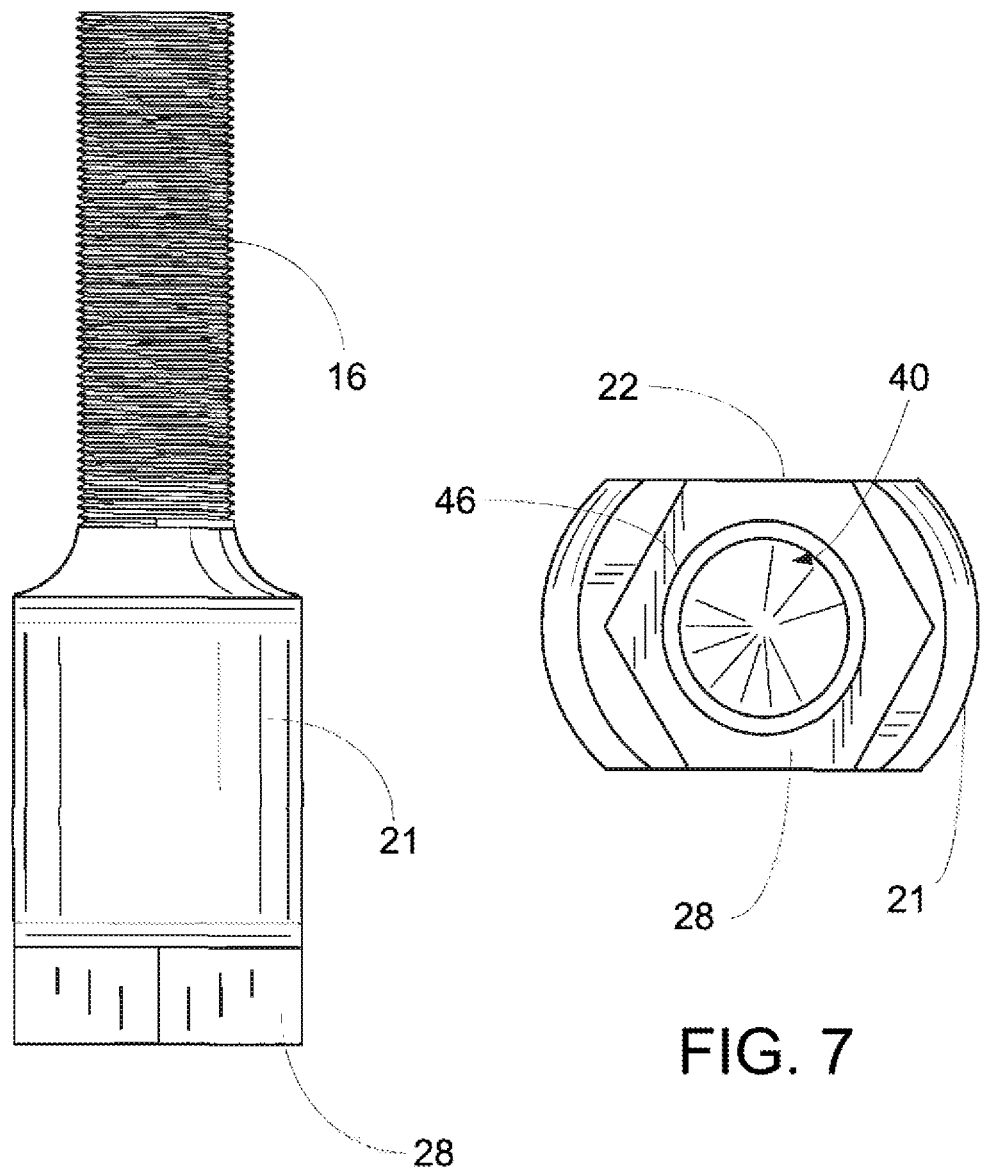
FIG. 6 is a side elevational view of the beam clamp connector of FIG. 2.
FIG. 7 is a bottom plan view of the beam clamp connector of FIG. 6.

Referring to FIGS. 1-10, there is shown a perspective view of the beam clamp connector according to the present invention. FIG. 1 shows beam clamp 10 attached to the beam clamp connector 12 and a threaded rod 14. Beam clamp 10 is secured to a beam (not shown) to provide support for threaded rod 14. FIG. 1 shows the assembled device in the fixed attachment position. FIGS. 2 and 3 show the beam clamp connector 12 including a threaded rod extender 16 integrally attached by material continuity to the connector portion 18. The rod extender 16 is cylindrical in shape and includes external threading 20 on the exterior surface 17 of the rod extender 16. A portion of the connector portion 18 may also include internal threads. The rod extender 16 extends from the top side 24 of the connector portion 18.

The connector portion 18 is shown in these figures as being generally cylindrical about two sides 21 and flat faced about two opposing sides 22 but other shapes will also suffice. The connector portion 18 includes a top side 24 of which the rod extender 16 extends therefrom, a bottom side 26 of which a tool engaging portion, or hexagonal portion 28 designed to be engaged by a tool protrudes therefrom by material continuity, and a central section or central body 19 extending between the top side 24 and the hexagonal portion 28. FIG. 2 shows two sides of the tool engaging or hexagonal portion 28 being continuous with the flat faced sides 22 of the connector portion 18 but this need not always be the case. The connector portion 18 includes an external surface and an internal surface 30 defining a pair of square or other shaped openings and an internal cavity or body opening 32. The body opening 32, in this case square, extends from one flat-faced side 22 to the other flat-faced side 22 through the connector portion 18. The internal surface 30 includes two side inner surfaces 34, a top inner surface 36 and a bottom inner surface 38. The material between the top side 24 and the top inner surface 36 includes a top cylindrical hole 40 which has threading 42 therein. The threading 42 and the top cylindrical hole 40 are sized to mate with a standard threaded rod 14.

The connector portion 18 includes a tool engaging portion or hexagonal portion 28 (but other shapes will suffice) extending from the bottom side 26. The material between the bottom inner surface 38 to the bottom external surface 44 of the hexagonal portion 28 includes a bottom cylindrical hole 46 therethrough. The bottom cylindrical hole 46 is unthreaded having a substantially smooth side wall 47 with the diameter D being larger than the standard outer diameter of a threaded rod 14 (and thus also larger than top cylindrical hole 40). Hence threaded rod 14 easily passes through bottom cylindrical hole 46.

Figure 8:
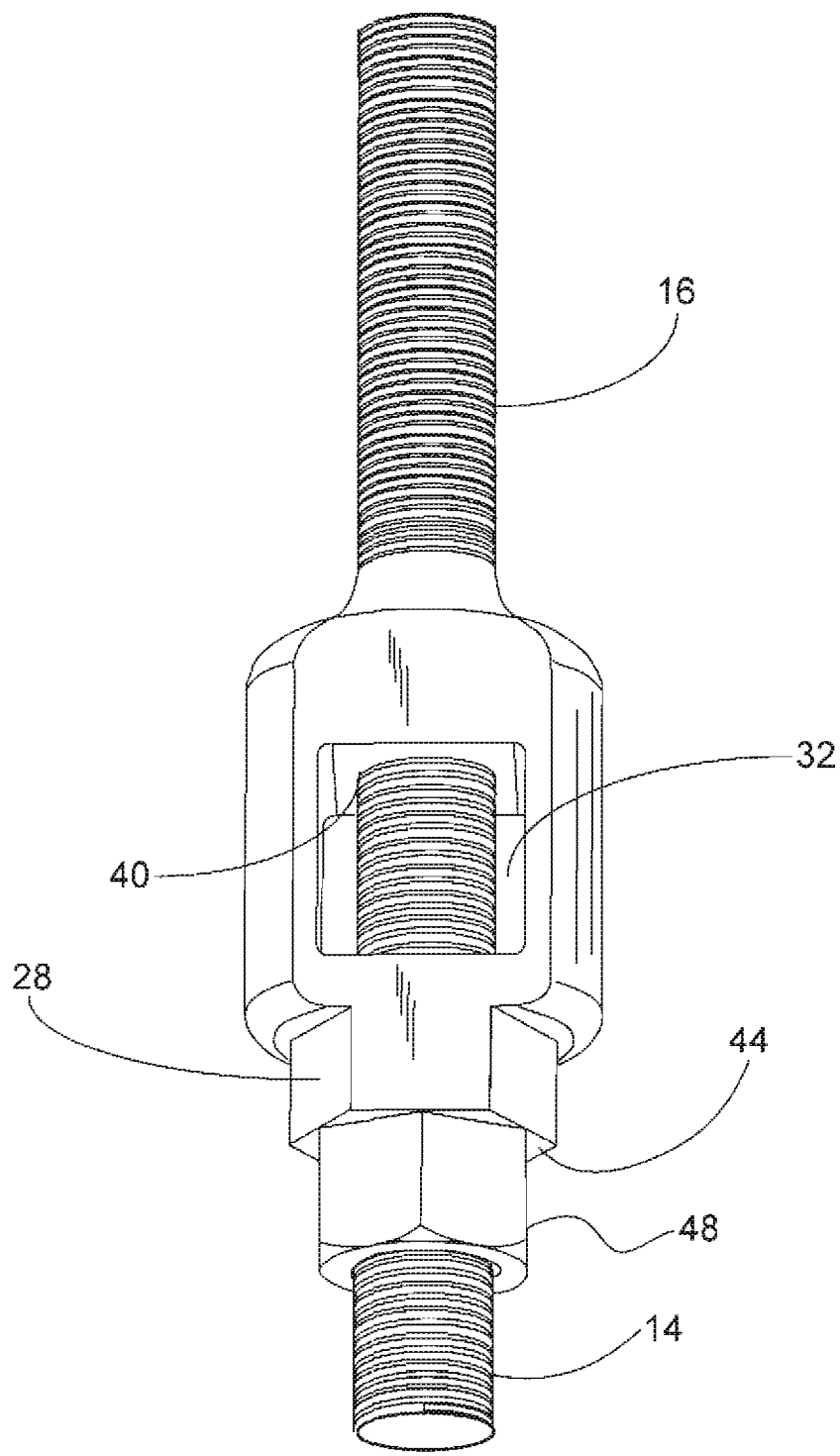
FIG. 8 is a side perspective view of the beam clamp connector of FIG. 2 in the fixed position including a threaded rod and nut attached thereto.

FIG. 8 shows the beam clamp connector 12 in the fixed position as similarly shown in FIG. 1. FIG. 8 shows a threaded rod 14 extending through the bottom cylindrical hole 46, through the body opening 32 and internally mated with the top cylindrical hole 40 via threads 42. An additional fastener, such as a nut 48, is secured to the threaded rod 14. The nut 48 is tightened against the bottom external surface 44 of the hexagonal portion 28 to prevent the threaded rod 14 from becoming loose. The nut 48 in conjunction with the threads 42 secures the threaded rod 14 in a fixed position. Threaded rod extender 16 may then be attached to a beam clamp body 10, as shown in FIG. 1 if not already done. A tool engaging portion defined by hexagonal portion 28 is configured so as to be readily accommodated by either a socket or a wrench. This makes it relatively easy to thread rod extender 16 of beam clamp connector 12 into beam clamp 10 and especially when beam clamp 10 is mounted to a beam well above floor level. In that situation, the user is able to readily secure beam clamp connector 12 to beam clamp 10 from underneath, and not from the side or above beam clamp 10 and/or the beam as is often the case.

Figure 9:
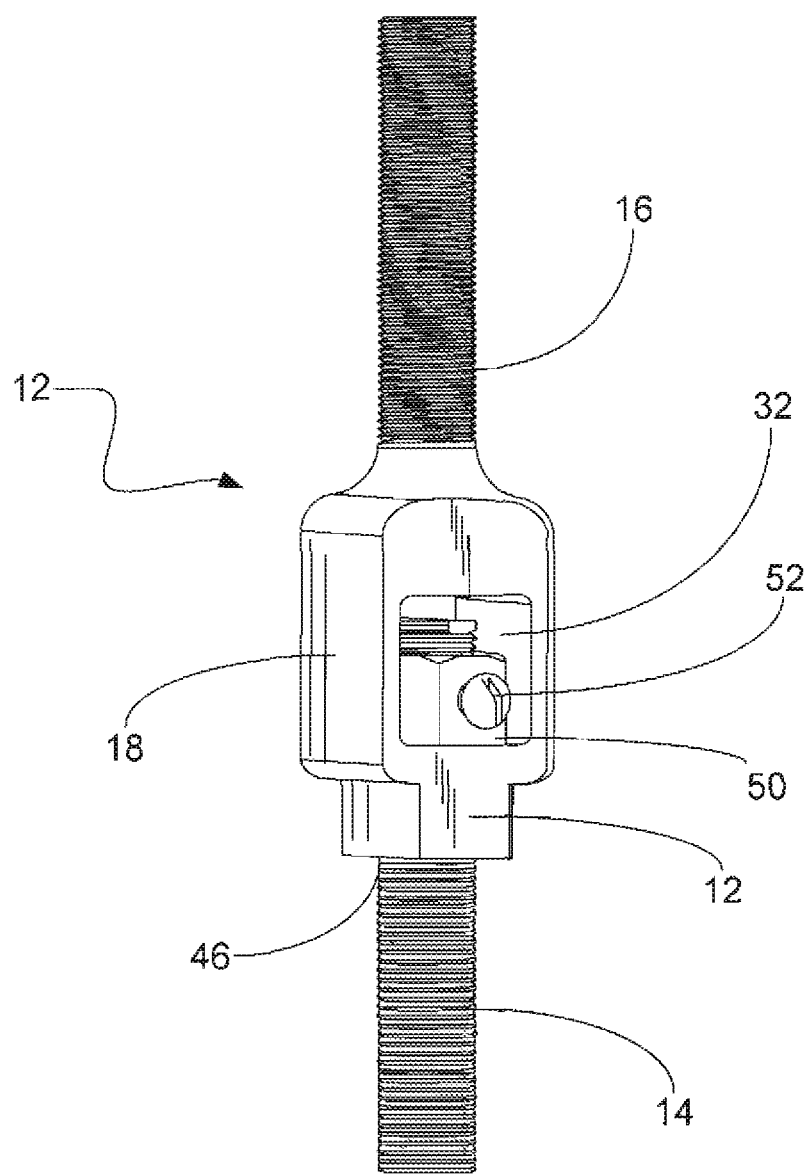
FIG. 9 is a perspective view of the beam clamp connector of FIG. 2 in the swivel position including a threaded rod, a nut, and a setscrew attached thereto.
Figure 10:
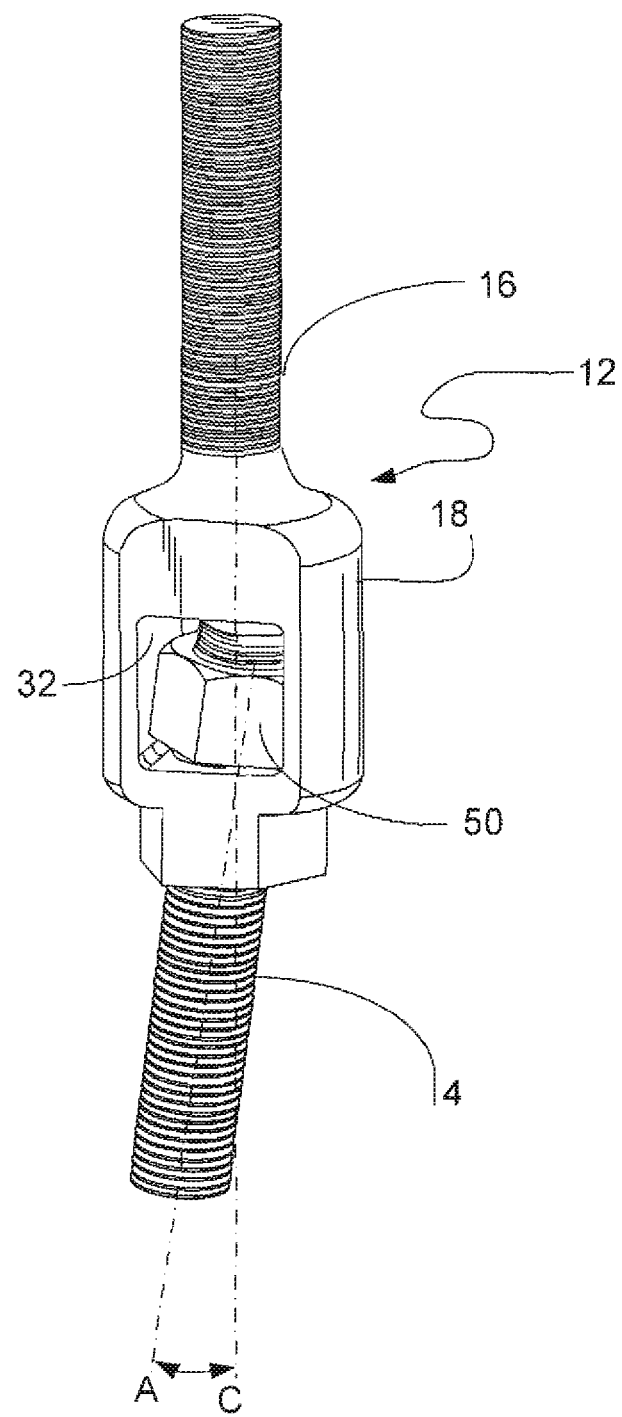
FIG. 10 is a side perspective view of the beam clamp connector of FIG. 2 in the swivel position including a threaded rod and a nut attached thereto.

FIGS. 9 and 10 show attachment of a threaded rod 14 in a swivel or pivotal position. The threaded rod 14 extends through the bottom cylindrical hole 46, and into the body opening 32. The threaded rod 14 is mated with additional fastener or nut 50 within the body opening 32. The nut 50 includes a set screw 52 which secures the nut 50 in place. Preferably, the nut 50 and body opening 32 are sized so as to prevent rotation of nut 50 when threaded rod 14 is threaded therethrough. In other words, body opening 32 effectively 'captures' nut 50. The threaded rod extender 16 is attached to a beam clamp 10 by threading as shown in FIG. 1.

The swivel position as shown in FIGS. 9 and 10 allows for the threaded rod 14 to pivot and swivel at an Angle A which is about 15° from center line C of the beam clamp connector 12. The threaded rod 14 may pivot at angle A around the center line C (360° about C) due to the oversize of opening 48 and retention by nut 50. This swivel feature compensates for mounting that may be offset or which requires some movement which is not allow or permitted for the threaded rod 14 connected in the fixed position.

Having described the preferred embodiments herein, it should now be appreciated that variations may be made thereto without departing from the contemplated scope of the invention. Accordingly, the preferred embodiments described herein are deemed illustrative rather than limiting, the true scope of the invention being set forth in the claims appended hereto.

What is claimed is:

1. A beam clamp connector, for use in connection with a beam clamp and a threaded rod, the beam clamp connector comprising:
   a connector portion including two cylindrical sides connected by two flat surfaced sides, a top side and a bottom side, the connector portion having a body opening therethrough, the body opening being defined by a top inner surface, a bottom inner surface and two opposing side inner surfaces, the bottom side including a tool engaging portion extending therefrom by material continuity, the connector portion having a bottom cylindrical hole extending from the bottom inner surface through the tool engaging portion; and
   a rod extender having a top end, a bottom end and a cylindrical shape extending therebetween, the bottom end being attached to the connector portion top side, the cylindrical shape including an exterior surface having threading thereon.

2. The beam clamp connector of claim 1 wherein the tool engaging portion further comprises two sides which are each continuous with one of the two flat surfaced sides.

3. The beam clamp connector of claim 1 wherein the tool engaging portion further comprises a hexagonal portion.

4. The beam clamp connector of claim 1 wherein the connector portion body opening extends from one of the two flat surfaced sides to another one of the flat surfaced sides.

5. The beam clamp connector of claim 1, further comprising the connector portion including a top cylindrical hole, the top cylindrical hole being threaded.

6. The beam clamp connector of claim 5, further comprising:
   the bottom cylindrical hole having a smooth internal surface and a diameter larger than a threaded rod; and
   the connector portion being adapted to receive the threaded rod projecting through the bottom cylindrical hole and projecting into the top cylindrical hole, the threaded rod being adapted for attachment to the threads of the top cylindrical hole, an additional nut being adapted for attachment to the threaded rod adjacent to the tool engaging portion, so that the threaded rod will be fixedly secured to the connector portion.

7. The beam clamp connector of claim 5, further comprising:
   the bottom cylindrical hole having a smooth internal surface and a diameter larger than a threaded rod; and
   the connector portion being adapted to receive the threaded rod projecting through the bottom cylindrical hole, an additional nut being adapted for attachment to the threaded rod, the nut being located within the body opening of the connector portion, so that the threaded rod will be pivotally secured to the connector portion.

8. A beam clamp connector, for use in connection with a beam clamp and a threaded rod, the beam clamp connector comprising:
   a connector portion including a central body having two cylindrical sides connected by two flat surfaced sides, a top side and a bottom side, the connector portion having a body opening therethrough, the body opening being defined by a top inner surface, a bottom inner surface and two opposing side inner surfaces, the bottom side including a tool engaging portion extending therefrom by material continuity, the connector portion having a bottom cylindrical hole extending from the bottom inner surface through the tool engaging portion, the bottom cylindrical hole having a smooth internal surface and a diameter larger than a threaded rod; and
   a rod extender having a top end, a bottom end and a cylindrical shape extending therebetween, the bottom end being attached to the connector portion top side, the cylindrical shape including an exterior surface having threading thereon.

9. The beam clamp connector of claim 8 wherein the tool engaging portion further comprises two sides which are each continuous with one of the two flat surfaced sides.

10. The beam clamp connector of claim 8 wherein the tool engaging portion further comprises a hexagonal portion.

11. The beam clamp connector of claim 8 wherein the connector portion body opening extends from one of the two flat surfaced sides to another one of the flat surfaced sides.

12. The beam clamp connector of claim 8, further comprising the connector portion being adapted to receive the threaded rod projecting through the bottom cylindrical hole, an additional nut being adapted for attachment to the threaded rod, the nut being located within the body opening of the connector portion, so that the threaded rod will be pivotally secured to the connector portion.

13. The beam clamp connector of claim 8, further comprising the connector portion including a top cylindrical hole, the top cylindrical hole being threaded.

14. The beam clamp connector of claim 13, further comprising the connector portion being adapted to receive the threaded rod projecting through the bottom cylindrical hole and projecting into the top cylindrical hole, the threaded rod being adapted for attachment to the threads of the top cylindrical hole, an additional nut being adapted for attachment to the threaded rod adjacent to the tool engaging portion, so that the threaded rod will be fixedly secured to the connector portion.

15. A beam clamp connector, for use in connection with a beam clamp and a threaded rod, the beam clamp connector comprising:
    a connector portion including a central body having two cylindrical sides connected by two flat surfaced sides, a top side and a bottom side, the connector portion having a body opening therethrough, the body opening being defined by a top inner surface, a bottom inner surface and two opposing side inner surfaces, the bottom side including a tool engaging portion extending therefrom by material continuity, the connector portion having a bottom cylindrical hole extending from the bottom inner surface through the tool engaging portion, the bottom cylindrical hole having a smooth internal surface and a diameter larger than a threaded rod, the connector portion including a top cylindrical hole, the top cylindrical hole being threaded; and
    a rod extender having a top end, a bottom end and a cylindrical shape extending therebetween, the bottom end being attached to the connector portion top side, the cylindrical shape including an exterior surface having threading thereon.

16. The beam clamp connector of claim 15 wherein the tool engaging portion further comprises two sides which are each continuous with one of the two flat surfaced sides.

17. The beam clamp connector of claim 15 wherein the tool engaging portion further comprises a hexagonal portion.

18. The beam clamp connector of claim 15 wherein the connector portion body opening extends from one of the two flat surfaced sides to another one of the flat surfaced sides.

19. The beam clamp connector of claim 15, further comprising the connector portion being adapted to receive the threaded rod projecting through the bottom cylindrical hole, an additional nut being adapted for attachment to the threaded rod, the nut being located within the body opening of the connector portion, so that the threaded rod will be pivotally secured to the connector portion.

20. The beam clamp connector of claim 15, further comprising the connector portion being adapted to receive the threaded rod projecting through the bottom cylindrical hole and projecting into the top cylindrical hole, the threaded rod being adapted for attachment to the threads of the top cylindrical hole, an additional nut being adapted for attachment to the threaded rod adjacent to the tool engaging portion, so that the threaded rod will be fixedly secured to the connector portion.

\* \* \* \* \*